United States Patent [19]
Graham

[11] Patent Number: 5,520,315
[45] Date of Patent: May 28, 1996

[54] BIKE RACK

[76] Inventor: Ronald A. Graham, 24285 92 Hwy., Platte City, Mo. 64079

[21] Appl. No.: 421,455

[22] Filed: Apr. 13, 1995

Related U.S. Application Data

[63] Continuation of Ser. No. 146,973, Nov. 3, 1993, abandoned.

[51] Int. Cl.$^6$ .................................. B60R 9/06; B60R 9/10
[52] U.S. Cl. ..................... 224/521; 224/501; 224/509; 224/525; 224/528; 224/530; 224/534; 224/537; 224/924
[58] Field of Search .................... 224/501, 509, 224/521, 525, 528, 530, 532, 534, 537, 924; 414/462; 280/504, 514, 515, 506, 493, 498, 495, 507

[56] References Cited

U.S. PATENT DOCUMENTS

| | | | |
|---|---|---|---|
| 1,802,285 | 4/1931 | Slattery | 480/495 |
| 2,574,276 | 11/1951 | Mills | 280/498 |
| 3,240,406 | 3/1966 | Logan | 224/42.03 B |
| 3,325,187 | 6/1967 | Noakes | 280/493 |
| 3,858,775 | 1/1975 | Haas | 224/42.03 B |
| 3,901,421 | 8/1975 | Kalicki et al. | 224/42.03 B |
| 4,646,952 | 3/1987 | Timmers | 224/42.07 |
| 4,702,401 | 10/1987 | Graber et al. | 224/537 |
| 4,804,120 | 2/1989 | Kraklio | 224/42.03 B |
| 4,815,638 | 3/1989 | Hutyra | 224/42.07 |
| 4,875,608 | 10/1989 | Graber | 224/42.03 B |
| 5,385,280 | 1/1995 | Littlepage et al. | 224/521 |

FOREIGN PATENT DOCUMENTS

| | | | |
|---|---|---|---|
| 2642024 | 7/1990 | France | 224/42.03 B |
| 2666775 | 9/1990 | France | 224/42.03 B |
| 97617 | 12/1939 | Sweden | 224/42.03 B |

*Primary Examiner*—Linda J. Sholl
*Attorney, Agent, or Firm*—Hovey, Williams, Timmons & Collins

[57] ABSTRACT

A bike rack apparatus is provided for supporting a bicycle on an automobile, and includes a channel for receiving the wheels of a bicycle and supporting the weight of the bicycle. The channel is supported on the automobile, preferably by a male hitch member sized for receipt in a female hitch member of the automobile, and includes a pair of clamps for stabilizing the apparatus on the automobile. The apparatus also includes a shackle assembly for holding a bicycle in an upright position on the channel and restraining movement of the bicycle relative to the channel.

2 Claims, 4 Drawing Sheets

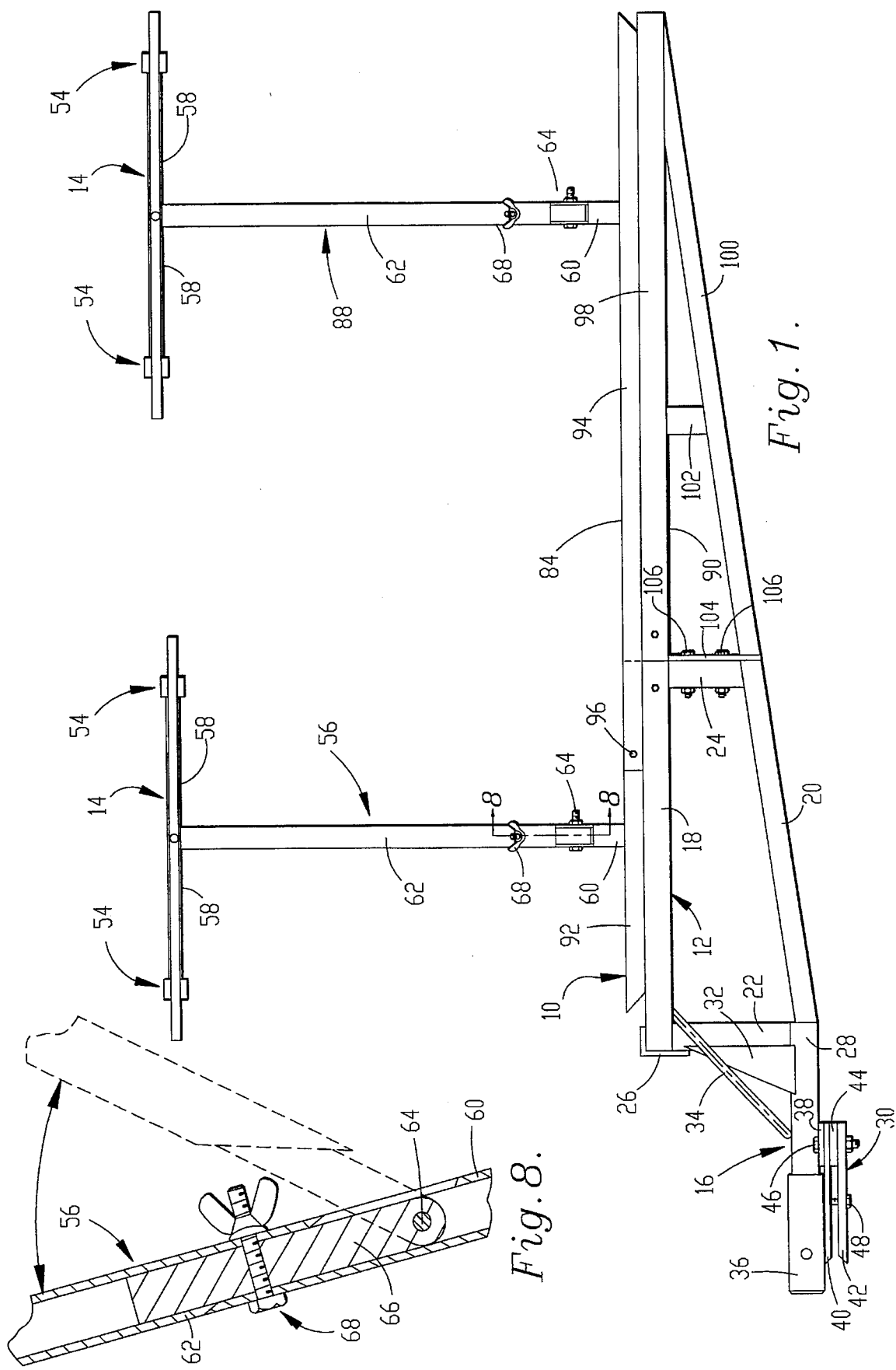

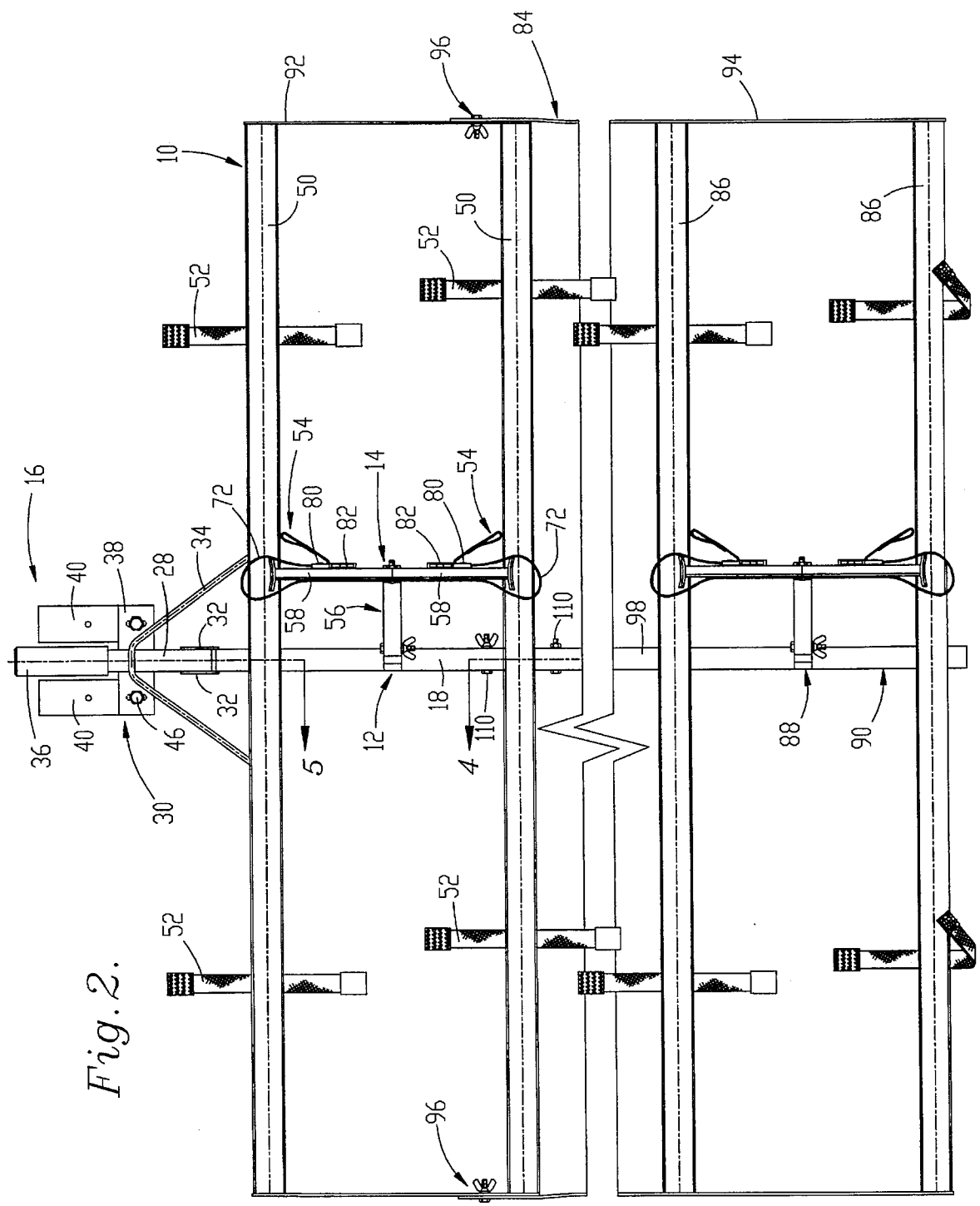

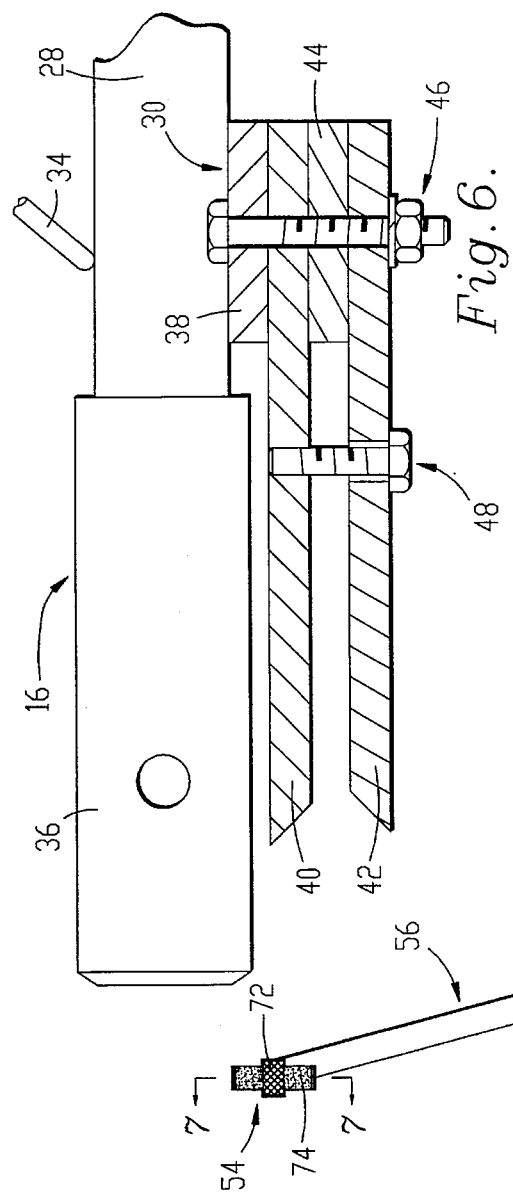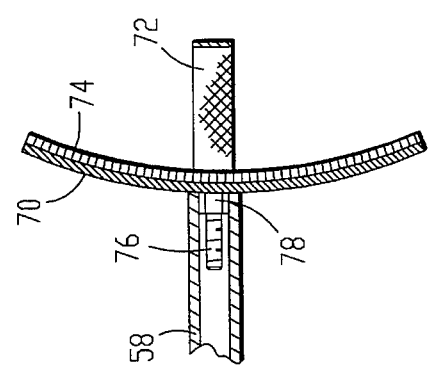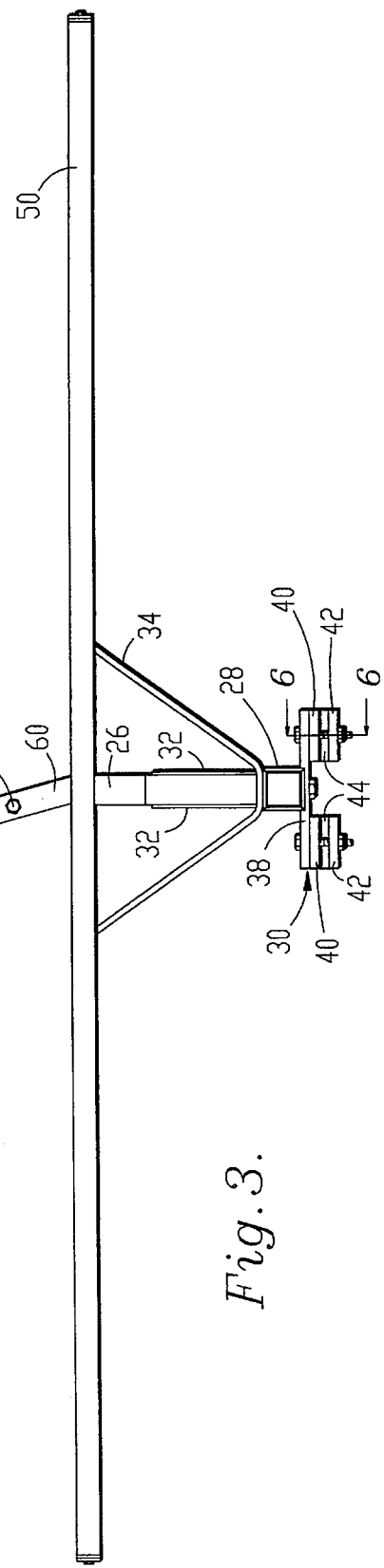

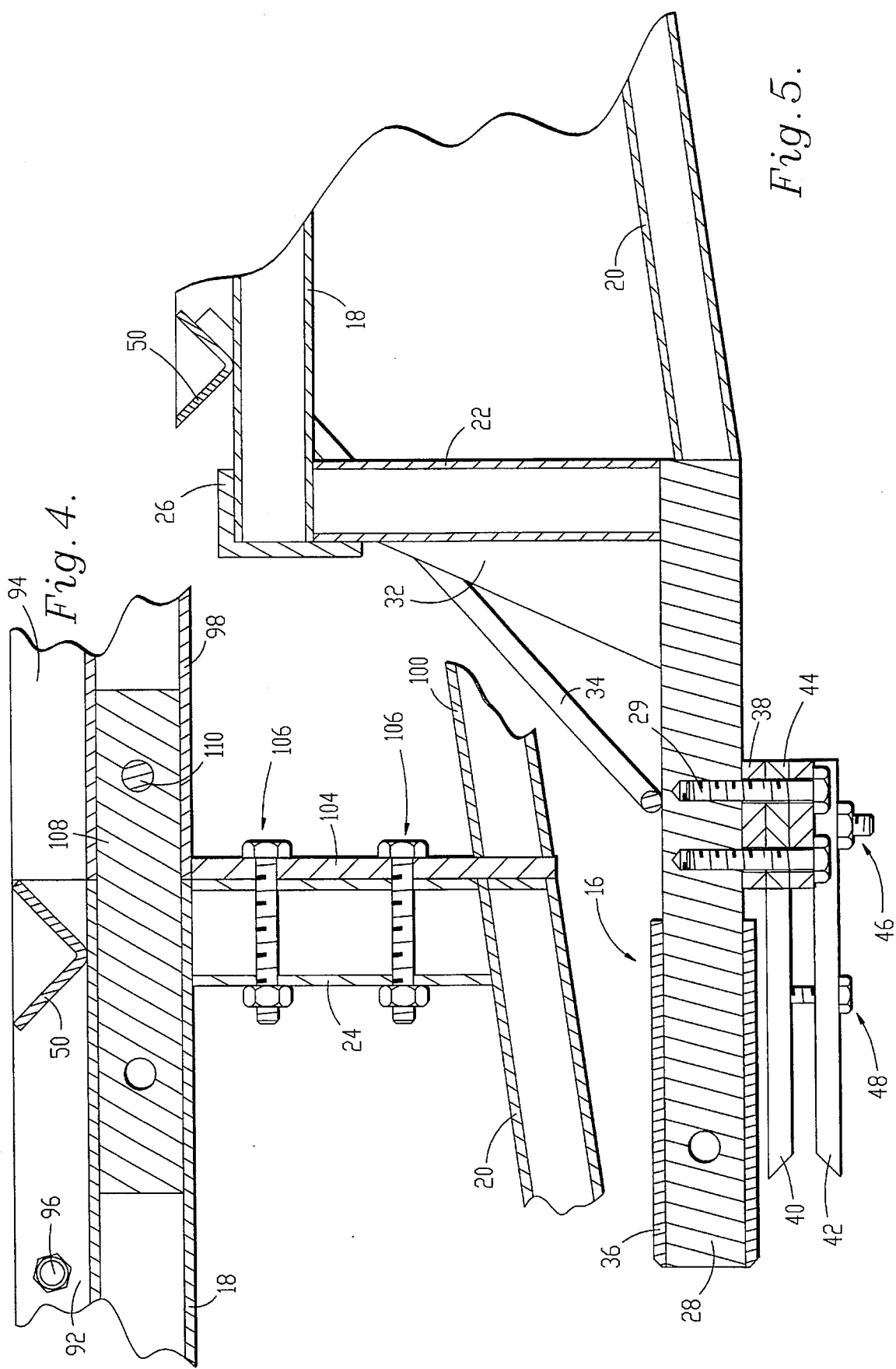

BIKE RACK

This application is a File Wrapper Continuation of application Ser. No. 08/146,973, filed Nov. 3, 1993, now abandoned.

BACKGROUND OF THE INVENTION

1. Field of the Invention

The present invention relates generally to bike racks and, more particularly, to a bike rack provided with a channel for supporting the wheels of a bicycle so that the weight of the bicycle is transferred to the rack through the wheels.

2. Discussion of the Prior Art

It is known to provide a bike rack that may be supported on the roof of an automobile, and which includes a channel for receiving the rear wheel of a bicycle, and a transverse cross piece to which a front fork of the bicycle may be attached upon removal of the front wheel from the fork.

In this known construction, it is necessary to first remove the front wheel of the bicycle, and to then lift the bicycle onto the roof of the automobile before the bicycle may be secured on the rack for transportation. In addition, the front wheel must be stowed separately.

According to another known construction, a bike rack is provided adjacent the rear bumper of the automobile, and includes cradle arms or the like from which the frame of a bicycle may be suspended. Typically, such devices are attached either to the automobile directly, or to a conventional hitch provided at the rear end of the automobile.

Although these suspension-type racks eliminate the necessity for lifting the bike onto the roof of the automobile, a problem arises due to the freedom of movement of the bicycle allowed by the rack. Because the handle bars and front wheel of the bicycle are typically free to pivot when the bike is suspended from the rack, and because the bike may swing on the rack, it is possible that the bike will damage the automobile or other bikes on the rack during transportation.

OBJECTS AND SUMMARY OF THE INVENTION

It is an object of the present invention to provide a bike rack apparatus which may be attached to a conventional trailer hitch at the rear of an automobile so that the apparatus is easily accessible for assembly, removal or use.

Another object of the invention is to provide an apparatus which is collapsible for storage, or expandable for use in transporting additional bicycles.

One further object is to provide an apparatus which supports a bicycle in the same manner in which the bicycle is normally supported during use so that the balance of the bicycle is not adversely affected when the bicycle is mounted and carried on the rack. This object is obtained not only by supporting the bicycle by its wheels, but also by restraining movement of the bicycle relative to the rack during transportation.

In accordance with these and other objects evident from the following description of a preferred embodiment, an apparatus for supporting a bicycle on an automobile includes a channel means for receiving the wheels of the bicycle and supporting the weight of the bicycle, and a support means for supporting the channel means on the automobile. A shackle means is also provided for holding the bicycle in an upright position on the channel means and restraining movement of the bicycle relative to the channel means.

By providing this construction, several advantages are obtained. For example, by providing a channel means which supports the weight of a bicycle, the bicycle rests on the rack in the same manner in which the bicycle normally rests on the ground during use so that the balance of the bicycle is not ruined by the rack.

Further, by providing a shackle means for holding the bicycle in place on the channel means, the bicycle is restrained relative to the rack during transportation, and is not allowed to swing or pivot in a manner which could cause damage to the bike or other objects around it.

BRIEF DESCRIPTION OF THE DRAWING FIGURES

A preferred embodiment of the present invention is described in detail below with reference to the attached drawing figures, wherein:

FIG. 1 is a side elevational view of a bike rack apparatus constructed in accordance with the preferred embodiment;

FIG. 2 is a top plan view of the apparatus;

FIG. 3 is a front elevational view of the apparatus;

FIG. 4 is a sectional view taken along line 4—4 of FIG. 2, illustrating the connection between the bike rack and a rack extension;

FIG. 5 is a sectional view taken along line 5—5 of FIG. 2, illustrating a hitch assembly of the apparatus;

FIG. 6 is a sectional view taken along line 6—6 of FIG. 3, illustrating the hitch assembly;

FIG. 7 is a sectional view taken along line 7—7 of FIG. 3, illustrating a shackle assembly of the apparatus; and FIG. 8 is a sectional view taken along line 8—8 of FIG. 1, illustrating a hinge assembly incorporated in the apparatus.

DETAILED DESCRIPTION OF THE PREFERRED EMBODIMENT

A preferred embodiment of the present invention is shown in FIG. 2, and consists of a bike rack for supporting a conventional bicycle on an automobile.

Although neither a bicycle nor an automobile are shown in the drawings, it is understood that the bike rack of the present invention may be used with any conventional on-road, off-road or hybrid bicycle. Further, the preferred embodiment includes a hitch means for mounting the bike rack on a conventional trailer hitch of the type comprising a square-shaped female hitch member and a pair of horizontal plates extending laterally from the female hitch member.

The bike rack broadly includes a channel means 10 for receiving the wheels of a bicycle and supporting the weight of the bicycle, a support means 12 for supporting the channel means on an automobile, and a shackle means 14 supported above the channel means for holding the bicycle in an upright position on the channel means and restraining movement of the bicycle relative to the channel means.

Turning to FIG. 1, the support means 12 includes a support assembly on which the channel means and shackle means are mounted, and a hitch means 16 for attaching the support assembly to the trailer hitch of an automobile. The support assembly includes a single, longitudinally extending support bar 18, formed of hollow tubing, that is reinforced by a second tubing section 20 disposed beneath the bar and secured thereto by a pair of upright tubular columns 22, 24. Preferably, the tubing employed in these sections 18, 20, 22, 24 is of hollow, square cross-sectional shape, and the sections are connected together and secured to the hitch means 16 by any conventional means, such as welding or the like. An L-shaped corner plate 26 is secured between the column and the section for reinforcing the support assembly.

Turning to FIG. 5, the hitch means 16 includes a male hitch member 28 sized for receipt in the female hitch member of the automobile, and a clamping assembly 30 rigidly secured to the male hitch member for clamping onto the horizonal plates of the trailer hitch to stabilize the apparatus during use. A pair of gussets 32 are welded between the support assembly and hitch member 28 to strengthen the connection, and a stabilizer 34 is provided between the channel means 10 and the male hitch member 28 for stabilizing the channel means against rocking about the longitudinal axis of the male hitch member.

An adaptor 36 is provided for increasing the effective cross-sectional area of the male hitch member in order to permit connection of the apparatus to conventional trailer hitches of various sizes. For example, by constructing the male hitch member for cooperation with a female hitch member having a 1.25" inner dimension, it is possible to adapt the male hitch member for use with a 2" female hitch member simply by securing the adaptor on the male hitch member. Although illustrated as a single sleeve, it is possible to provide the adaptor in the form of four plates which, when fastened to the sides of the male member, increase the outer dimension thereof to correspond with the inner dimension of the female member.

The clamping assembly 30 includes a transverse plate 38 fastened to the male hitch member 28 by a pair of bolts 29, a pair of laterally spaced, longitudinally extending upper fingers 40, a pair of similarly shaped lower fingers 42 opposing the upper fingers, and at least one spacer 44 provided between the upper and lower fingers to define a gap therebetween. Additional spacers may be used between the transverse plate 38 and fingers 40, 42 in order to provide the desired spacing between the upper and lower fingers, and to position the fingers at the proper height relative to the horizontal plates of the trailer hitch.

As illustrated in FIG. 6 the upper and lower fingers 40, 42 on each side of the male hitch member 28 are held together by a fastener 46, e.g. a bolt and nut combination, that extends through the fingers and the transverse plate 38. If desired, the transverse plate 38, or the fingers 40, 42, may be provided with slots for receiving the bolts 46, as shown in FIG. 2, so that the longitudinal position of the fingers may be adjusted relative to the male hitch member 28. Spacers may be added to or taken from the assembly as needed. A threaded adjustment bolt 48 extends upward through each of the lower fingers 42 into threaded holes formed in the upper fingers 40, and may be screwed into or out of the threaded openings in order to provide fine adjustment of the spacing between the fingers.

By providing this construction, the rack may be mounted on the automobile with the male hitch member received in the female hitch member and with the horizontal plates sandwiched between the upper and lower finger pairs. Once the rack is positioned on the hitch, the adjustment bolts 48 are tightened so that the fingers press against and grip the plates, stabilizing the bike rack against wobbling.

Returning to FIG. 2, the channel means 10 includes a pair of spaced parallel channels 50, each opening upward to receive the wheels of a bicycle. Preferably, each channel is formed of a C-shaped or L-shaped piece of metal that is welded to the support bar 18 and extends in a direction transverse to the bar. Each channel is slightly longer than the wheel base of a conventional bicycle so that when the bicycle is positioned on the channel, both wheels are received in the channel and do not extend beyond the ends thereof. A pair of straps 52 are provided in association with each channel and are used to strap the wheels of the bicycle onto the channel so that the bike does not roll in the channel during transportation. These straps may be secured to the channels if desired, or may simply be provided separately and wrapped around the channels when a bike is mounted on the rack.

The shackle means 14 includes a T-shaped stand attached to and extending upward from the support bar 18, and a pair of shackle assemblies 54. As shown in FIG. 3, the stand includes an upright leg 56 that is angled relative to horizontal by an angle of 72°–76°, corresponding to the range of angles at which the central, upright frame member of conventional male and female bicycles extend. A pair of transverse arms 58 are attached to the top of the leg and extend in a direction perpendicular to the direction in which the channels extend as illustrated in FIG. 2.

Turning to FIG. 8, the leg 56 is formed of a lower tubing section 60 and an upper tubing section 62, wherein the upper section is secured to the lower section at a pivot axis 64 extending in a direction parallel to the arms. Preferably, a solid block of metal 66 having a square cross-sectional shape protrudes from the lower end of the upper tubing section 62 and is received on the pivot axis to permit the upper section and arms 58 to be pivoted relative to the lower section 60 between a raised position, as shown in solid lines, and a lowered position shown in dashed lines. A threaded bolt 68 and wing nut combination, or a thumb screw is provided for retaining the upper tubing section in the raised position during use of the rack, and for permitting the upper section to be lowered for storage of the rack.

As shown in FIG. 7, each shackle assembly 54 includes a bearing plate 70, a means for securing the plate to the end of one of the arms, and a strap 72 for holding the bike frame against the bearing plate and restraining movement of the bicycle in the underlying channel.

The bearing plate includes an arcuate piece of metal which is backed with a padded material 74 such as outdoor carpet or the like so that when the frame of the bicycle is strapped against the plate, the frame contacts the padded material and is protected against abrasion. The plate 70 is secured to the end of one of the arms 58 by a threaded member 76 that is secured to the convex surface of the metal plate opposite the padded material. Each arm 58 is formed of hollow square tubing, and is provided at the free end with a solid square end piece 78 that is tapped to receive the threaded member 76. By providing this type of connection, it is possible to adjust the position of the bearing plate over the underlying channel and to o orient the bearing plate at any desired angle relative to the frame of the bike to be supported by the assembly.

Returning again to FIG. 2, a strap 72 is provided for each shackle assembly. Each strap includes a first end that is securely fastened to one side of the arm supporting the shackle assembly, and a second end that may be looped around the bearing plate and connected to the side of the arm opposite the first strap end. Preferably, a first latch 80 is received on the strap, and a second latch 82 is attached to the arm, the first and second latches interlocking when pushed together to hold the strap on the arm to define a closed loop. Once the first and second latches are connected together, the strap may be pulled tight through the first latch, if desired.

Examples of this type of latching arrangement may be found in conventional flotation devices, backpacks, and seat belts. By providing this construction, it is possible to secure a bicycle to each side of the stand so that both bicycles are held in place on the rack for transportation.

As shown in FIG. 1, it is possible to provide a rack extension 84 for permitting additional bicycles to be transported on the apparatus. The extension includes a pair of channels 86 similar to the channels 50, a stand 88 and shackle assemblies similar to the shackle means 14, and a support assembly 90 which connects to the support means 12 of the apparatus.

Turning to FIG. 2, the channels 50 of the apparatus are illustrated as including enclosed end walls 92 which close off the channels and provide support and rigidity to the apparatus. The extension also includes end walls 94, but these end walls extend beyond the channels so that they may be fastened to the end walls 92 by bolt and wing nut combinations 96, or the like. This secures all of the channels together so that they do not tip relative to one another.

Returning to FIG. 1, the support assembly 90 of the extension is illustrated as including an upper support bar 98 reinforced by an angled lower tubing section 100 and an upstanding tubular column 102. The assembly also includes a plate 104 connecting the lower section to the support bar 98. As illustrated in FIG. 4, the plate 104 is fastened to the column 24 of the support means 12 by a pair of bolt and nut combinations 106. In addition, a solid piece of square cross-sectional metal 108 extends into the support bars 18, 98 of the assemblies, and is secured to each bar by a bolt and nut or bolt and wing nut combination 110, as shown in FIG. 2. Thus, the extension may be securely fasted to the apparatus in order to increase the bike carrying capacity of the rack.

Once the apparatus has been attached to the automobile in the manner described above, a bicycle may be mounted on the apparatus by simply lifting the bicycle above the channel 50, and setting the wheels of the bicycle down into the channel so that the weight is transferred through the wheels to the rack in the same manner as when the bicycle is being ridden. Thereafter, the strap 72 of the shackle assembly immediately over the channel is wrapped around a tubular section of the bicycle frame and latched shut so that the bicycle frame is retained between the strap and the bearing plate 70. The strap is then pulled tight relative to the first latch 80 in order to draw the frame against the bearing plate so that the bicycle is restrained from rolling along the channel, and is secure for transportation. If additional straps are provided they may be wrapped around the channel through the wheels of the bicycle so that additional restraint against movement is obtained.

If a second bicycle is to be loaded on the rack, it is mounted in the other channel in an orientation facing the opposite direction than the first bicycle on the rack. In addition, the head tube of one of the bicycles is secured in one of the shackle assemblies, while the seat tube of the other bicycle is supported in the opposed shackle assembly. In this manner, the handle bars of the bicycles do not rub against one another, and less room is needed to store the bikes behind the automobile. If the extension 84 is being used, two additional bikes may be mounted on the rack, again in a stacked fashion with each alternate bike facing a direction opposite the bikes to either side thereof.

Although the invention has been described with reference to the preferred embodiment illustrated in the attached drawing figures, it is noted that substitutions may be made and equivalents employed without departing from the scope of the invention as recited in the claims.

What is claimed is:

1. A bike rack apparatus for supporting a bicycle on an automobile, wherein the automobile is provided with an elongated female hitch member presenting a rectangular opening and a pair of horizontal plates extending laterally from the female hitch member, and the bicycle includes a frame and a pair of wheels supported on the frame, the apparatus comprising:

a channel means for receiving the wheels of the bicycle and supporting the weight of the bicycle;

a support means for supporting the channel means on the automobile; and a shackle means supported above the channel means for holding the bicycle in an upright position on the channel means and restraining movement of the bicycle relative to the channel means, the support means including a support assembly on which the channel means and shackle means are mounted, and a hitch means for attaching the support assembly to the automobile, the hitch means including a male hitch member of rectangular cross-sectional shape sized for receipt in the female hitch member of the automobile, and a pair of clamps rigidly secured to the support assembly and extending in a direction parallel to the male hitch member for clamping onto the horizontal plates to stabilize the apparatus during use.

2. An apparatus as recited in claim 1, further comprising adaptor means for adapting the male hitch member for connection with female hitch members of varying sizes.

\* \* \* \* \*